April 15, 1924.

W. ROSS

FIGURE TOY

Filed Nov. 29, 1922

Witnesses:
J. L. Fox
H. Berman

W. Ross,
INVENTOR.
BY Clarence A. O'Brien
ATTORNEY.

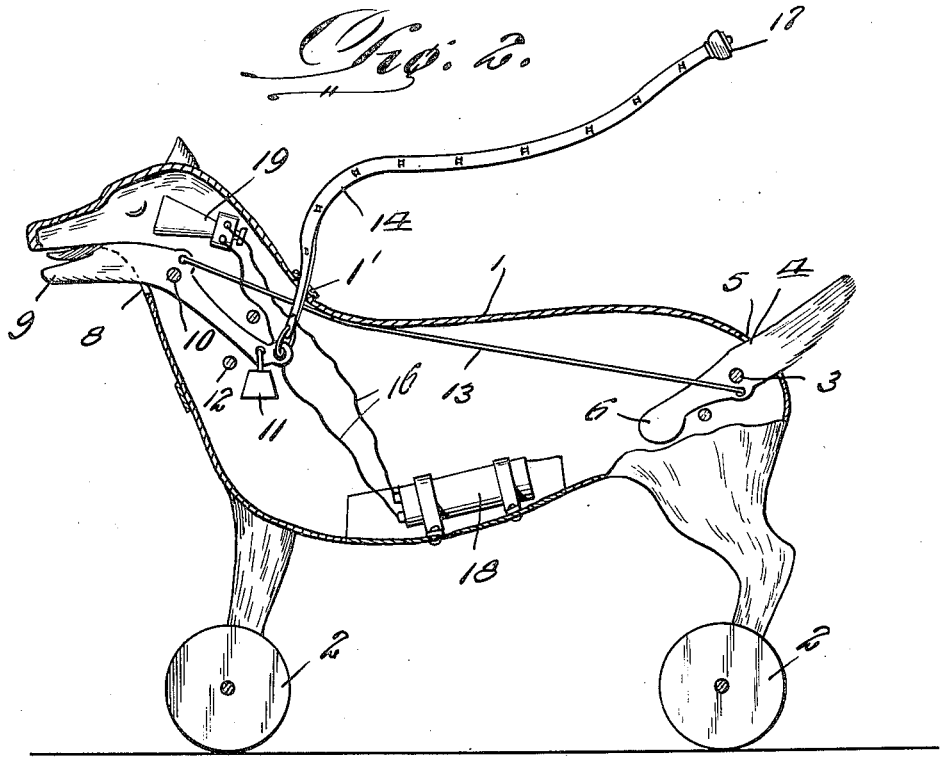
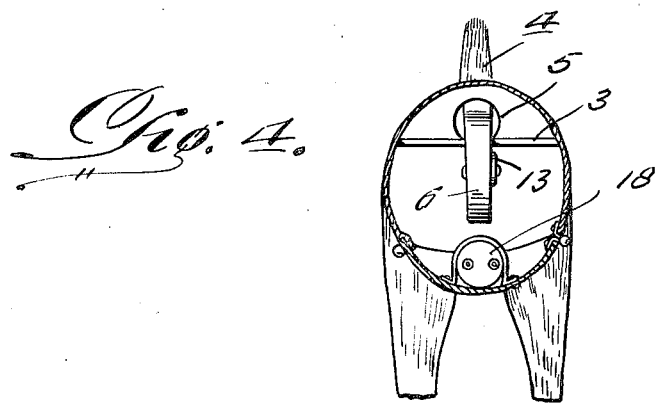

Patented Apr. 15, 1924.

1,490,185

UNITED STATES PATENT OFFICE.

WALTER ROSS, OF FLUSHING, NEW YORK.

FIGURE TOY.

Application filed November 29, 1922. Serial No. 603,975.

*To all whom it may concern:*

Be it known that I, WALTER ROSS, a citizen of the United States, residing at Flushing, in the county of Queens and State of New York, have invented certain new and useful Improvements in Figure Toys, of which the following is a specification.

My invention relates to improvements in figure toys, and specifically to that type of toy, which is formed so as to represent an animal, such as a dog or the like.

The primary object of the invention resides in the provision of such a device that is adapted to be pulled along the ground by children, and whilst undergoing such an action, there will be emitted a sound somewhat similar to the bark of a dog, and at the same time, certain portions of the dog's anatomy, such as his mouth and tail, will be caused to move, assimilating the actions of a real dog.

A further object of the invention is the provision of such a device that is comparatively simple of construction, inexpensive of manufacture, and such a toy that will prove highly amusing to small children.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is a longitudinal sectional view thereof.

Figure 4 is a transverse sectional view on the line 4—4 of Figure 1.

Figure 1:
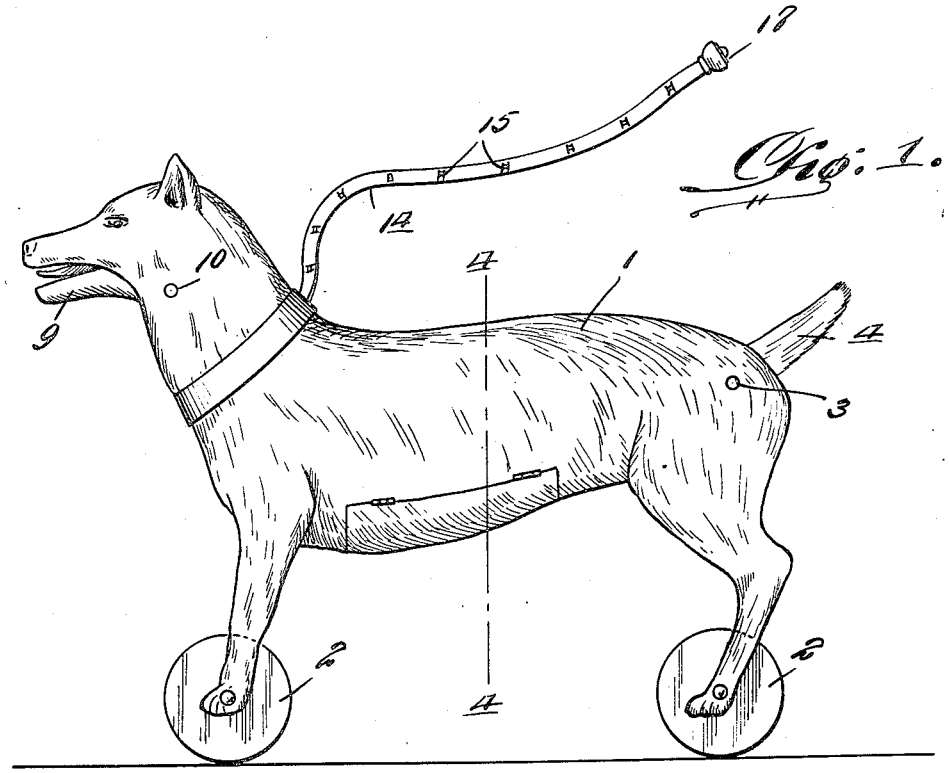
Figure 1 is a side elevational view of a toy constructed in accordance with the present invention.

With particular reference to the drawings, my toy includes the provision of a hollow body 1, so formed as to assimilate the shape of an animal, such as a dog or the like. The front and rear legs of the body 1 carry wheels 2 for allowing the toy to be adequately moved upon the ground. Pivotally disposed rearwardly within the body 1 by a transversely disposed pivot pin 3 is a member 4 projecting at one end through an opening 5 in the body 1, which projecting end is so designed as to represent the tail of the animal. The inner end of this member 4 is weighted as at 6, which weighted end normally maintains the outer projecting end of the member 4 in an upwardly extending position as shown in Figures 1, 2 and 4. Downward movement of the inner end of the member 4 is limited by a suitable pin 7.

Figure 3:
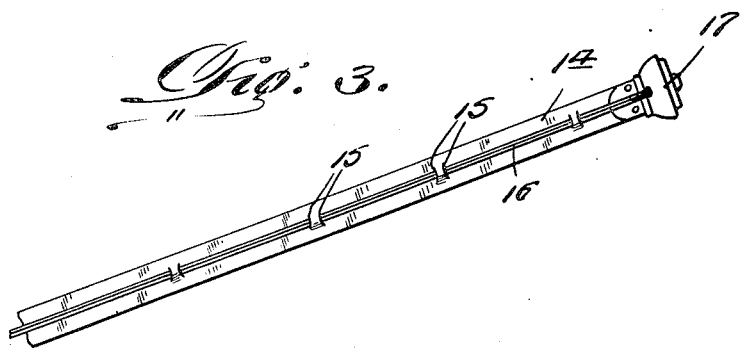
Figure 3 is a fragmentary plan view of a specific form of pulling strap employed by me in connection with the present invention.

The portion of the body 1, representing the head of the animal has an opening 8 therein, adapted for receiving the outer end of a member 9, which outer end is so shaped as to represent the lower jaw of the dog. This member 9 is pivotally secured as at 10 within the neck portion of the body and the lower end thereof carries a weight 11, for normally maintaining the jaw representation 9 in a closed position. Swinging movement of the jaw 9 is limited in opposite directions by pins 12 engaging opposite sides of the inner end of the said member 9. Loosely secured at its opposite ends to convenient points upon the front pivotal member 10, and rear pivotal member 4 is a connecting rod or cable 13. Whereby any rocking movement of the front member 9 upon its pivot 10, will occasion a similar rocking movement to the rear pivotal member 4. Secured to the extreme inner end of the pivotal member 9 is one end of a flexible strap 14 and as more clearly shown in Figure 3, this strap is provided with pairs of spaced transverse slots 15 for receiving therethrough an electric wire 16. Secured in any manner desirable upon the inner end of this strap 14 is a desirable form of push button switch 17, which has electrical connection with the said wires 16.

These wires 16 are also electrically connected to a suitable source of electric energy such as a dry cell battery 18, supported within the body 1 of the toy, and a sound emitting device 19 which may be in the form of an electric horn or the like 20. The flexible strap 16 extends through an opening in the body of the toy and it will therefore be seen that in the act of pulling the toy 1 over the ground, through the instrumentality of the flexible strap 14, a slight jerk upon this strap will occasion a movement of the pivotal members 4 and 9, for assimilating the movement of a dog's tail and the opening and closing of his mouth. Further, by actuating the switch 17, a sound will be emitted from the sounding device 19, for assimilating the barking of a dog.

While I have herein shown and described the preferred embodiment of the present invention, it is nevertheless to be understood that minor changes may be made therein, without departing from the spirit and scope of the invention as claimed.

What I claim as new is:—

In a toy, a hollow body representing a quadruped, a pivoted jaw mounted below the head of the quadruped, an angularly disposed extension carried thereby, a handle passing loosely through the body and having pivotal connection with the extension, a tail for the quadruped pivoted within the rear end of the same, stop pins extending transversely through the animal adapted to limit movement of the jaw and tail, and a rod pivotally connected with the tail and jaw intermediate their ends.

In testimony whereof I affix my signature.

WALTER ROSS.